US006577413B1

(12) United States Patent
Saunders (10) Patent No.: US 6,577,413 B1
(45) Date of Patent: Jun. 10, 2003

(54) METHOD AND APPARATUS FOR POLARIZATION MULTIPLEXING AND DEMULTIPLEXING OPTICAL TRIBUTARY SIGNALS

(75) Inventor: Ross Alexander Saunders, Fife (GB)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 09/518,134

(22) Filed: Mar. 3, 2000

(51) Int. Cl.⁷ .............................................. H04J 14/06
(52) U.S. Cl. ...................... 359/122; 359/156; 359/135; 359/173
(58) Field of Search ............... 359/122, 156, 359/135, 173, 495, 306, 561

(56) References Cited

U.S. PATENT DOCUMENTS

| | | | |
|---|---|---|---|
| 3,532,890 A | 10/1970 | Denton ........................ 250/199 |
| 4,700,339 A | 10/1987 | Gordon et al. .................. 270/3 |
| 5,111,322 A | * 5/1992 | Bergano et al. ............. 359/122 |
| 5,223,975 A | * 6/1993 | Naganuma et al. ......... 359/487 |
| 5,608,565 A | 3/1997 | Suzuki et al. ................ 359/154 |
| 5,625,479 A | 4/1997 | Suzuki et al. ................ 359/135 |
| 6,301,030 B1 | * 10/2001 | Robinson ..................... 359/122 |

FOREIGN PATENT DOCUMENTS

| | | |
|---|---|---|
| EP | 0 507 508 A | 10/1992 |
| EP | 0 980 155 A | 2/2000 |

OTHER PUBLICATIONS

Dennis, M. L.,et al: "Soliton Loop Mirror Demultiplexer Using Orhogonally Polarizes Signal and Control", vol. 8, No. 7 Jul. 1, 1996, pp. 906–908, ISSN: 1041–1135.

Heismann, F. et al: "Automatic Polarization Demultiplexer for Polarization–Multiplexed–Transmission Systems", Proceedings of the European Conference on Optical Communication (ECOC), CH, Zurich, Sev, vol. CONF. 19, 1993, pp 401–404.

ECOC'93, 19$^{th}$ European Conference on Optical Communication, Sep. 12–16, 1993, Proceedings, vol. 2, Regular Papers, by F. Heismann, P.B. Hansen, S.K. Korotky, G. Raybon, JJ. Veselka and M.S. Whalen, pp. 401–404.

OFC Optical Fiber Communication, Feb. 25–Mar. 1, 1996, vol. 2, 1996 Technical Digest Series Conference Edition, by Michael L. Dennis,, Irl N. Duling, III and Mark F. Arend, pp. 236–237.

(List continued on next page.)

Primary Examiner—Kinfe-Michael Negash
(74) Attorney, Agent, or Firm—Finnegan, Henderson, Farabow, Garrett & Dunner, L.L.P.

(57) ABSTRACT

An embodiment includes a polarization beam splitter and a feedback unit, preferably having an autocorrelator, a processing unit and a polarization controller. Polarized splitter separates the lower-speed tributary signals out of the higher-speed optical signal based upon a polarization relationship (e.g., orthogonal) between the tributary signals. The feedback unit, typically an autocorrelator and a polarization adjustment device, adjusts the higher-speed signal's state of polarization based upon an autocorrelation value of one of the lower-speed tributary signals. The autocorrelation value of one of the lower-speed tributary signals is provided to the polarization adjustment device, which typically includes a processing unit and a polarization controller. The polarization adjustment device adjusts the higher-speed signal's polarization state based upon the autocorrelation extinction ratio value. Ideally, this type of adjustment feedback is performed until the autocorrelation value is maximized for optimal demultiplexing. This type of adjustment is normally performed as part of a feedback loop to track changes in the higher-speed signal's state of polarization.

18 Claims, 5 Drawing Sheets

OTHER PUBLICATIONS

Nuclear Instruments and Methods in Physics Research Section A, Title "A Broadly Tunable Autocorrelator for Ultra–Short, Ultra–High Power Infrared Optical Pulses", by Eric B. Szarmes and John M.J. Madey, dated Aug. 21–25, 1995, pp. 492–495.

SPIE–The International Society for Optical Engineering, Title: "Polarization Multiplexer/Demultiplexer Based on Polarizing Computer–Generated Holograms", by J. Hobfeld, T. Tschudi and W. Dultz, dated Aug. 19–20, 1993, vol. 2043, pp. 132–136.

Electronics Letters, dated Feb. 16, 1995, vol. 31 No. 4, Title: "Demonstration of Sliding–Filter–Controlled Soliton Transmission at 20 Gbit/s Over 14MM", by d. LeGuen, F. Favre, R. Boittin, J. Debeau, F. Devaux, M. Henry, C. Thebault and T. Geroges, pp. 301–302.

IEEE, Photonics Technology Letters, Nov. 1994, vol. 6 No. 11, Title: "60 Gb/s ×2 ch Time/Polarization–Multiplexed Soliton Transmission Over 154 km Utilizing an Adiabatically Compressed, Gain–Switched, DFB–LD Pulse Source", by K. Iwatsuki, K. Suzuki, S. Nishi and M. Saruwatari, pp. 1377–1379.

ISSN 0145–8030, vol. 14 No. 1, 1995, Fiber and Integrated Optics, Title: "250–Gb/s Self–Clocked Optical TDM with a Polarization–Multiplexed Clock", by I. Glesk and P. R. Prucnal, pp. 71–82.

The International Society for Optical Engineering, vol. 756, Optical Technologies for Space Communication Systems, Jan. 15–16, 1987, Title: "Design of a Wavelength Division Multiplexing/Demultiplexing System for Optical Intersatellite Links", by B. Laurent and J. L. Perbos.

OSA TOPS on Ultrafast Electronics and Optoelectronics, 1997, vol. 13, Title: "Low Latency, Ultrafast Fiber Loop Mirror Switch Using Orthogonally Polarized Signal and Control Solitons", by L. Leng, S.D. Koehler, .N. Kutz and K. Berman, pp. 57–59.

ISSN: 0740–03224, Journal of the Optical Society of America B, Optical Physics, vol. 8, No. 3, Mar. 1991, Title: "Wavelength–Dependent Soliton Self–Routing in Birefringent Fiber Filters", pp. 602–613.

Optics Communications, vol. 125, Nos. 1,2,3, Apr. 1, 1996, Title: "Interactions of Orthogonally Polarized Solitons in Optical Fibers", by C. De Angelis and S. Wabnitz, pp. 186–196.

* cited by examiner

METHOD AND APPARATUS FOR POLARIZATION MULTIPLEXING AND DEMULTIPLEXING OPTICAL TRIBUTARY SIGNALS

BACKGROUND OF THE INVENTION

The present invention relates generally to systems for polarization demultiplexing within optical transmission systems, and specifically to systems for polarization demultiplexing a higher-speed multiplexed optical signal into lower-speed polarized tributary signals using lower-speed electro-optics to measure the tributary autocorrelation value for use in optimally demultiplexing the higher-speed signal.

In the field of optics and optical transmission systems, multiplexing different data streams for transmission within a system is common. Typically, two or more lower-speed tributary signals are combined or multiplexed together in time slots to form a higher-speed multiplexed signal. For example, two 10 Gbit/sec (lower-speed) tributary signals may be bit-interleaved or multiplexed in alternating time slots to form a 20 Gbit/sec (higher-speed) multiplexed signal. In this way, a single optical path can support transmission of data from multiple sources to multiple receivers.

One way to increase the transmission capacity of such a system is to use optical time domain multiplexing (OTDM) and optical time domain demultiplexing (OTDD). However, the multiplexed transmission capacity of many optical transmission systems is typically limited by the speed of available electro-optics. Multiplexing lower-speed tributary signals into a higher-speed multiplexed optical signal and then demultiplexing the tributary signals out again usually requires wideband electro-optics capable of running at the higher-speed of the multiplexed signal. As the speed of the multiplexed signal increases, the availability of electro-optics that operate at this increased speed unfortunately diminishes and can be a problem for optical transmission system designers.

Applicant has observed that a problem with most OTDD techniques is that they require gating signals at the same or higher-speed as the multiplexed signal. In the previously mentioned example, a gating signal of at least 20 GHz is usually required to handle demultiplexing two 10 Gbit/sec optical tributary signals from a 20 Gbit/sec multiplexed signal. This may be cost prohibitive or impractical as the speed of the multiplexed signal increases.

Furthermore, many existing demultiplexing methods are polarization sensitive, such as techniques using $LiNbO_3$ modulators or conventional four-wave mixing (FWM) to demultiplex higher-speed signals. In these systems, wideband or high-speed driving signals and high-speed electro-optics are often still required to effectively demultiplex the tributary signals from the multiplexed signal.

Patents and publications have described general polarization multiplexing and demultiplexing of tributary signals within optical transmission systems. For example, in an article authored by F. Heismann, P. B. Hansen, S. K. Korotky, G. Raybon, J. J. Veselka and M. S. Whalen entitled "Automatic Polarization Demultiplexer for Polarization-Multiplexed Transmission Systems" and published in Proceedings, Vol. 2 of 19th European Conference on Optical Communication, published on Sep. 12, 1993 (hereinafter "the Heismann article"), the authors describe multiplexing two orthogonally polarized optical signals into a single fiber and then demultiplexing them using an automatic polarization demultiplexer. More particularly, the Heismann article describes using a polarization transformer in combination with a simple polarization splitter within the demultiplexer.

Additionally, in an article authored by M. L. Dennis, I. N. Duling III, and M. F. Arend entitled "Soliton Loop Mirror Demultiplexer with Polarization-Multiplexed Signal and Control" and published in Optical Fiber Communication '96 Technical Digest Series, Vol. 2 on Feb. 25, 1996 (hereinafter "the Dennis article"), the authors generally describe a nonlinear optical loop mirror-based demultiplexer using orthogonally polarized signals and control streams while operating in the soliton regime. The Dennis article further states that polarization multiplexing of control and signal ensures a high ON/OFF extinction ratio while allowing single wavelength operation.

SUMMARY OF THE INVENTION

In accordance with the invention as embodied and broadly described herein, in one aspect, an apparatus is described for polarization demultiplexing a multiplexed optical signal into optical tributary signals within the context of an optical transmission system. In general, the apparatus includes a polarization beam splitter for separating one of the optical tributary signals from the other optical tributary signals. Upon receiving the multiplexed optical signal, separation into tributaries is based upon a polarization relationship. This relationship is preferably an orthogonal relationship between the tributaries in order to provide low crosstalk on the receiving end. Typically, the polarization beam splitter has a first output providing one optical tributary signal and a second output providing another optical tributary signal.

The apparatus also includes a feedback unit which receives one of the optical tributary signals. The feedback unit is optically coupled to an input of the polarization beam splitter. The feedback unit adjusts a polarization state of the multiplexed optical signal based upon an autocorrelation value of one of the optical tributary signals. The autocorrelation value is measured by the feedback unit. Adjustments are typically made to the polarization state depending upon an extinction ratio calculated using autocorrelation values for the signal.

Additionally, the feedback unit typically includes an autocorrelator and a polarization adjustment device. The autocorrelator has input optically coupled to one of the optical tributary signals and provides the autocorrelation value of that optical tributary signal on a low-speed output. The polarization adjustment device has an optical input for receiving the multiplexed optical signal, an optical output coupled to the input of the polarized splitter, and a control input coupled to the low-speed output of the autocorrelator. In this configuration, the polarization adjustment device can adjust the polarization state of the multiplexed optical signal --.--.

The polarization adjustment device may be operative to maximize the autocorrelation value by adjusting the polarization state of the multiplexed optical signal. The polarization adjustment device may also determine an extinction ratio of one of the optical tributary signals based upon the autocorrelation value and maximize the extinction ratio by adjusting the polarization state of the multiplexed optical signal.

The polarization adjustment device typically includes a processing unit and a polarization controller. The processing unit is coupled to the low-speed output of the autocorrelator and provides a feedback signal on its feedback output based upon the autocorrelation value. The polarization controller has an optical input for receiving the multiplexed optical signal, an optical output coupled to the input of the polarized splitter, and a feedback input coupled to the feedback output of the processing unit. In this configuration, the polarization controller can adjust the polarization state of the multiplexed optical signal based upon the value of the feedback signal.

The processing unit may be operative to maximize the autocorrelation value by altering the feedback signal provided to the polarization controller so that the polarization controller can responsively sweep the polarization state of the multiplexed optical signal over a portion of a Poincare sphere. Furthermore, the processing unit may be further operative to determine an extinction ratio of one of the optical tributary signals based upon the autocorrelation value and to maximize the extinction ratio by altering the feedback signal to sweep the polarization state of the multiplexed optical signal over the portion of the Poincare sphere.

In another aspect, a polarization multiplexed optical transmission system is described. In general, the system includes a polarization multiplexer, a high-speed optical path coupled to an output of the polarized multiplexer, and a polarization demultiplexer coupled to the high-speed optical path. The polarization multiplexer has a first input for receiving a first low-speed tributary signal and a second input for receiving a second low-speed tributary signal. The polarized multiplexer can time division multiplex the first low-speed tributary signal and the second low-speed tributary signal into a higher-speed optical signal in a predetermined polarization relationship, such as an orthogonal relationship, with the first low-speed tributary signal being offset from the second low-speed tributary signal in time by a predefined time period, such as a bit period. In other words, a first pulse in the first low-speed tributary signal and an adjacent pulse in the second low-speed tributary signal are offset in time and offset in polarization. The polarization multiplexer avoids coherent mixing of the first low-speed tributary signal and the second low-speed tributary signal by maintaining the predetermined polarization relationship as the tributary signals are multiplexed. This predetermined polarization relationship is typically orthogonal. The high-speed optical path receives the higher-speed optical signal and provides it to the polarized demultiplexer.

The polarized demultiplexer, which includes a polarized splitter and a feedback unit, receives and demultiplexes the higher-speed optical signal. The polarization beam splitter (known more generally as a polarized splitter) receives the higher-speed optical signal and separates the first low-speed tributary signal from the second low-speed tributary signal within the higher-speed optical signal. The feedback unit is optically coupled to an input of the polarized splitter and can adjust a polarization state of the higher-speed optical signal based upon an amplitude characteristic (e.g., an autocorrelation value) of the first low-speed tributary signal measured by the feedback unit.

Additionally, the feedback unit may include an autocorrelator and a polarization adjustment device. The autocorrelator has an input optically coupled to the first low-speed tributary signal from the polarized splitter. In general, the autocorrelator measures the amplitude characteristic and provides it on a low-speed output based upon an autocorrelation value of the first low-speed tributary signal. The extinction ratio of the autocorrelation trace is dependent on the input state of polarization (SOP). The higher the extinction ratio, the more efficient the tributary polarization demultiplexing is. The polarization adjustment device has an optical input for receiving the higher-speed optical signal, an optical output coupled to an input of the polarized splitter, and a control input coupled to the low-speed output of the autocorrelator. The polarization adjustment device is capable of adjusting the polarization state of the higher-speed optical signal based upon the autocorrelation value.

The polarization adjustment device may also maximize the autocorrelation value or extinction ratio (ER) by adjusting the polarization state of the higher-speed optical signal. In this manner, the system advantageously optimizes how the higher-speed optical signal is demultiplexed without resorting to high-speed electro-optics. Furthermore, the polarization adjustment device typically is able to determine an extinction ratio of the first low-speed tributary signal based upon the autocorrelation value and maximize the extinction ratio by adjusting the polarization state of the higher-speed optical signal.

In yet another aspect, a method is described for polarization demultiplexing at least two optical tributary signals into a higher-speed optical signal. The method begins by receiving the higher-speed optical signal and separating a first optical tributary signal from a second optical tributary signal based upon a predetermined polarization relationship between the tributary signals. Typically, the predetermined polarization relationship is an orthogonal relationship. An autocorrelation value of the first optical tributary signal is determined. Based upon the determined autocorrelation ER value, the polarization state of the higher-speed optical signal is adjusted. Typically, the polarization state of the higher-speed optical signal is adjusted and then another autocorrelation value is determined in a repetitive manner in order to maximize the autocorrelation value in a control loop. More particularly stated, the polarization state of the higher-speed optical signal is adjusted by sweeping the polarization state of the higher-speed optical signal over a portion of a Poincare sphere and repeating the determining step in order to maximize the autocorrelation ER value.

Additionally, an extinction ratio of the first optical tributary signal may be determined over a predefined period of time. Typically, the autocorrelation value is used to help determine the extinction ratio for the tributary signal. Accordingly, the polarization state of the higher-speed optical signal can be adjusted based upon the extinction ratio. Furthermore, the polarization state of the higher-speed optical signal can be adjusted by sweeping the polarization state of the higher-speed optical signal over a portion of a Poincare sphere and repeating the determining step in order to maximize the extinction ratio.

Due to the orthogonality of the polarization multiplexed tributaries, maximizing the autocorrelation extinction ratio of one polarization demultiplexed tributary will maximize the extinction ratio of the other polarization beam splitter port. This means that the control electronics and polarization adjustment are needed only for one tributary.

BRIEF DESCRIPTION OF THE DRAWINGS

The accompanying drawings, which are incorporated in and constitute a part of this specification, illustrate embodiments of the invention, and together with the description, explain the advantages and principles of the invention.

It is to be understood that both the foregoing general description and the following detailed description are exemplary and explanatory only and are not restrictive of the invention, as claimed. The following description, as well as the practice of the invention, set forth and suggest additional advantages and purposes of this invention.

DETAILED DESCRIPTION OF THE PREFERRED EMBODIMENTS

Reference will now be made to various embodiments according to this invention, examples of which are shown in the accompanying drawings and will be evident from the description of the invention. In the drawings, the same reference numbers represent the same or similar elements in the different drawings whenever possible.

It is known that polarization multiplexing and demultiplexing in optical transmission systems enhances the efficiency of such a system and allows multiple data streams to be sent through a single optical path. In most systems, this type of multiplexing and demultiplexing requires high-speed or wideband electro-optics. For example, some systems require high-speed electro-optics capable of regenerating a high-speed clock signal with which to demultiplex a multiplexed signal.

However, the applicant has discovered that demultiplexing a polarization multiplexed optical signal can be accomplished without the use of high-speed or wideband electro-optics. A demultiplexing system consistent with an embodiment of the invention has a polarized splitter for separating a high-speed multiplexed optical signal into tributary signals and a low-speed feedback unit for measuring the autocorrelation value of one of the tributaries and adjusting the polarization state of the high-speed optical signal. An autocorrelator within the feedback unit can generate a control signal indicating the amplitude of the measured tributary extinction ratio. In response to the control signal, it is desirable to maximize the autocorrelation extinction ratio by processing the control signal and adjusting the polarization state of the multiplexed signal accordingly. In this manner, the multiplexed optical signal can be advantageously demultiplexed without using high-speed electro-optics.

Figure 1:
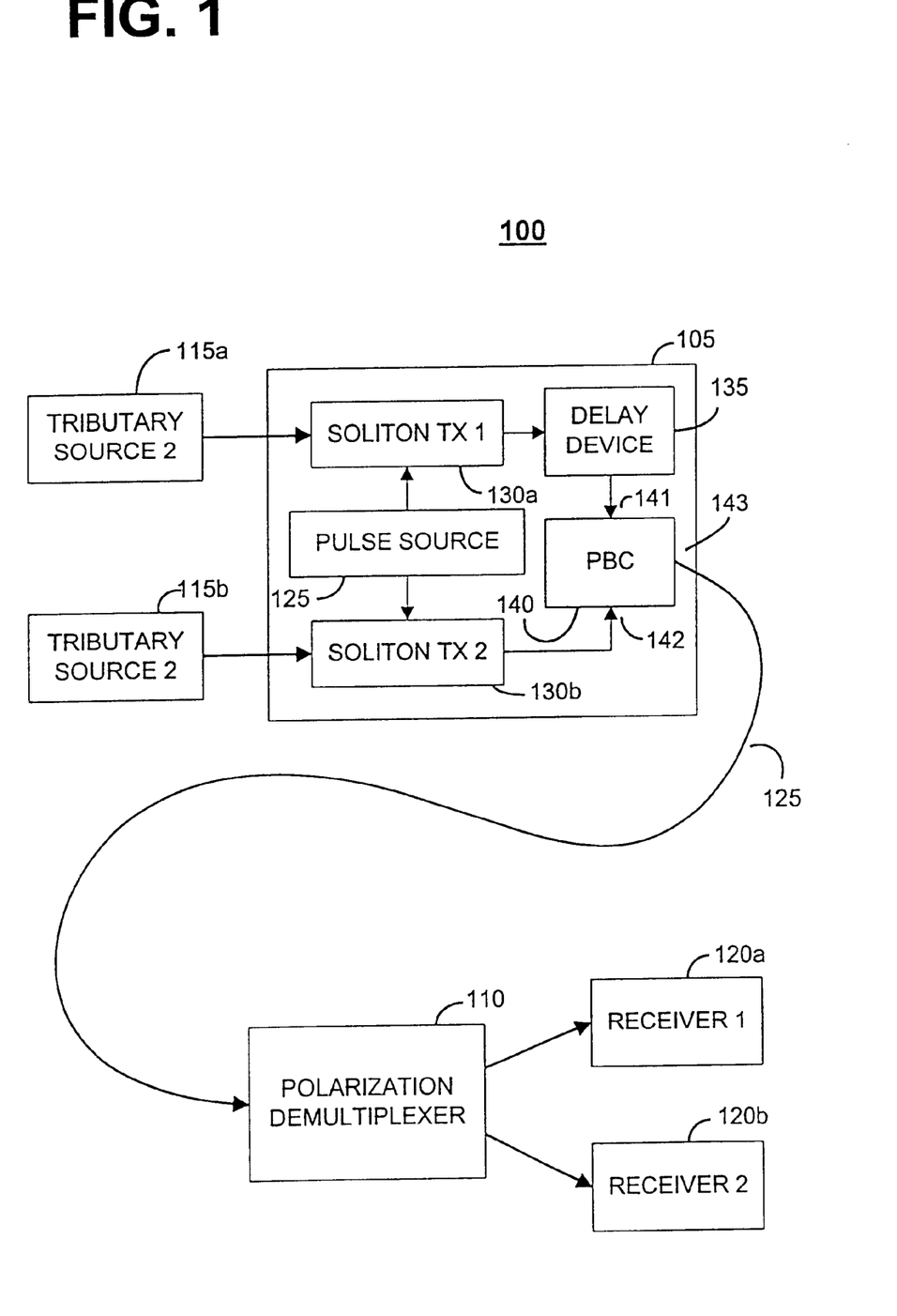
FIG. 1 is a block diagram illustrating a polarization multiplexed/demultiplexed optical transmission system consistent with an embodiment of the present invention.
Figure 2:
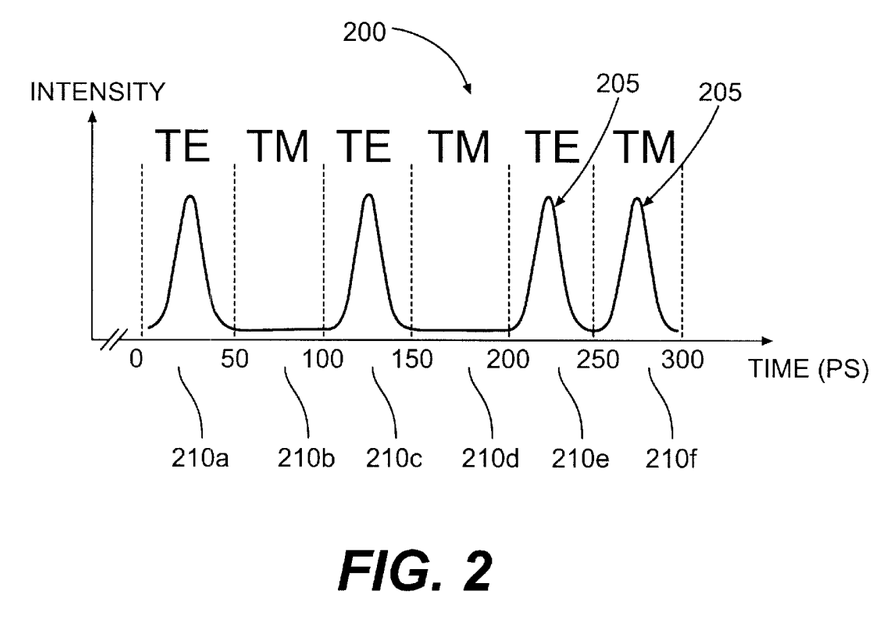
FIG. 2 is a graphic illustration of an exemplary polarization multiplexed binary signal containing tributary signals shifted in time and time division multiplexed in an orthogonal polarization relationship consistent with an embodiment of the present invention.
Figure 3:
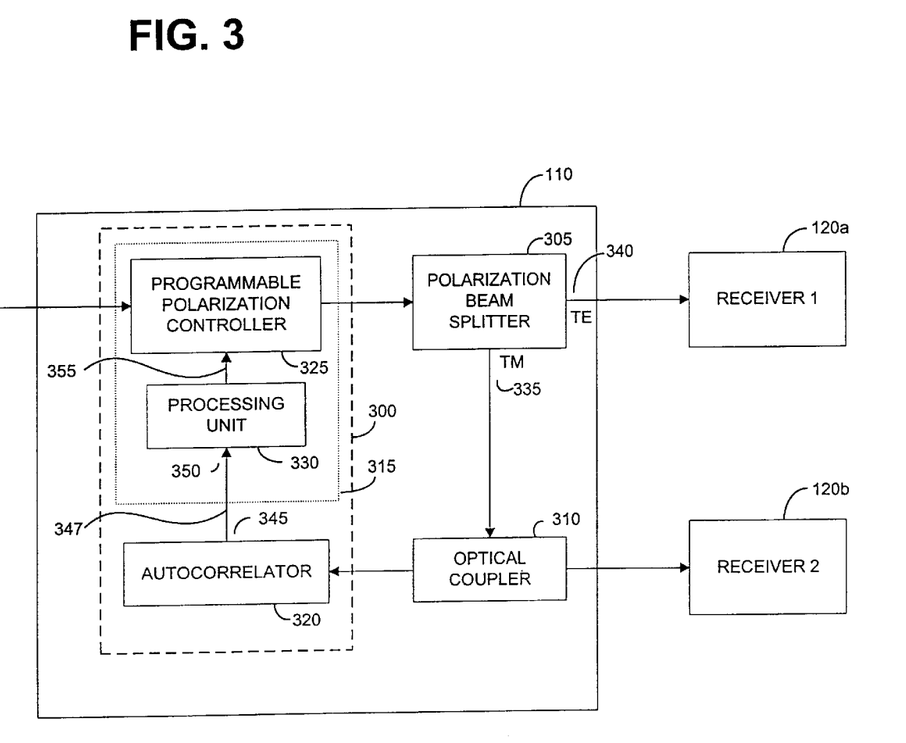
FIG. 3 is a block diagram illustrating an exemplary polarization demultiplexer consistent with an embodiment of the present invention.
Figure 4:
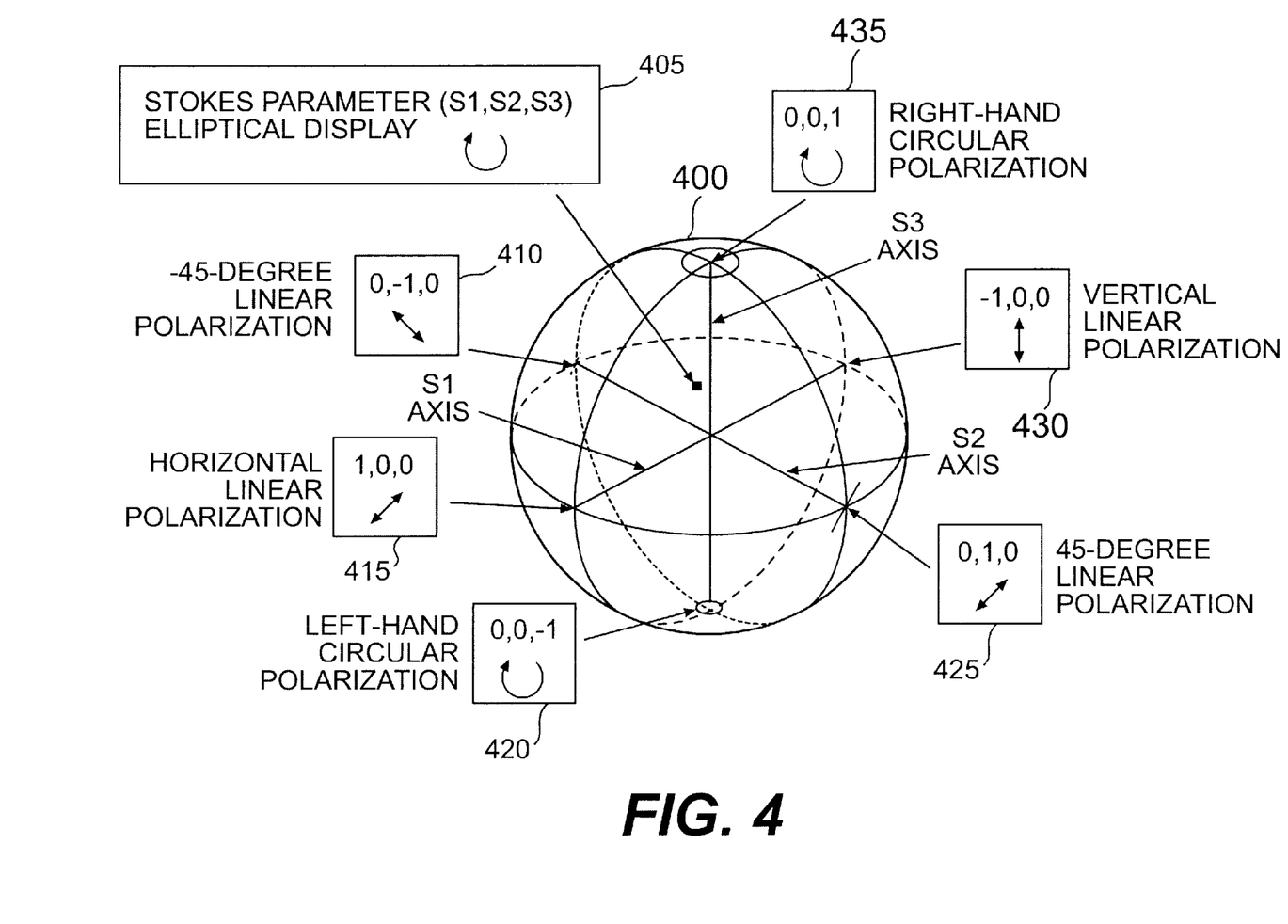
FIG. 4 is a diagram illustrating an exemplary Poincare Sphere which graphically represents different states of polarization consistent with an embodiment of the present invention.
Figure 5:
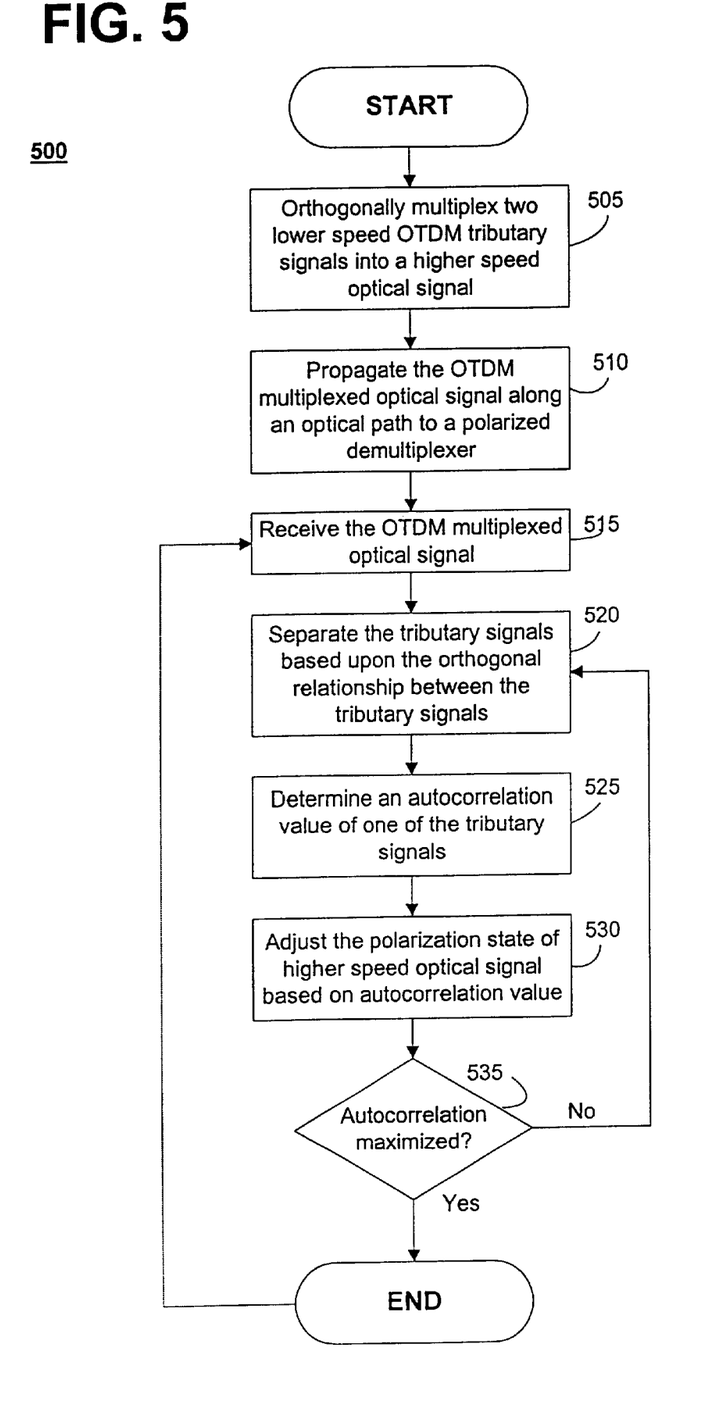
FIG. 5 is a flow diagram illustrating exemplary steps for polarization demultiplexing at least two optical tributary signals from a higher-speed optical signal consistent with an embodiment of the present invention.

In summary, FIG. 1 is a block diagram illustrating an exemplary optical transmission system that multiplexes and demultiplexes an optical signal consistent with an embodiment of the present invention. FIG. 2 graphically illustrates an exemplary polarization multiplexed signal containing tributary signals that are shifted in time and multiplexed in an orthogonal polarization relationship. FIG. 3 depicts an exemplary polarization demultiplexer in more detail. FIG. 4 shows an exemplary Poincare Sphere which graphically represents different states of polarization consistent with an embodiment of the present invention. FIG. 5 is a flow diagram illustrating steps for polarization demultiplexing two optical tributary signals from a higher-speed optical signal consistent with an embodiment of the present invention.

As shown in FIG. 1, according to an embodiment of the present invention, an optical transmission system 100 is illustrated that multiplexes different data streams into a higher-speed optical signal and demultiplexes the higher-speed optical signal without using high-speed electro-optics. In general, the optical transmission system 100 includes one or more tributary sources 115a, 115b (typically at 10 Gb/sec line rates). These sources send signals through a polarization multiplexer 105 to multiplex them up to an aggregate high-speed rate (typically 20 Gb/sec). The polarization multiplexed signal is then sent through a high-speed optical path (such as an optical fiber 125) to a polarization demuliplexer 110. At this point, the signals are then demultiplexed and received by one or more corresponding receivers 120a, 120b (typically conventional 10 Gb/sec receivers).

In more detail, tributary sources 115a, 115b are essentially data sources at a lower data rate. In the exemplary embodiment, tributary sources 115a, 115b are data sources running at approximately 10 Gbits/second. These sources provide distinct streams of data that are subsequently multiplexed together by polarization multiplexer 105.

In polarization multiplexer 105, the data streams provided by tributary sources 115a, 115b are multiplexed together into a higher-speed optical signal. In the exemplary embodiment, this is accomplished by modulating two soliton transmitters 130a, 130b (shown in FIG. 1 as soliton tx 1 130a and soliton tx 2 130b) with the data streams before polarization multiplexing the resulting optical tributary signals together to form the higher-speed optical signal. Those skilled in the art will recognize that a soliton transmitter, such as soliton transmitters 130a, 130b, produces a soliton pulse which is a type of optical pulse commonly used in optical communication systems due to its ability to retain its pulse shape over a long distance. The sources do not have to be soliton transmitters for the present invention involving polarization mux/demux. However, the applicant has noted that polarization multiplexing solitons in adjacent time slots increases the possible transmission distance.

In more detail, polarization multiplexer 105 preferably includes a pulse source 125 that produces a pulsed signal having a repetition rate equal to the tributary data rate (e.g., 10 Gbits/second). The pulsed signal is preferably split two ways using a 3 dB splitter or coupler. Each branch is then fed from pulse source 125 to one of the soliton transmitters 130a, 130b. In this way, the data streams provided by tributary sources 115a, 115b are used to gate the soliton pulses produced by soliton transmitters 130a, 130b. For example, a series of logical ones would produce an optical tributary signal having a series of sequential soliton pulses.

Once each optical tributary signal has been generated, polarization maintaining fiber is typically used to couple each optical tributary signal to a polarization beam combiner (PBC) 140. It is preferred that the state of polarization of each optical tributary signal is linearly polarized and launched into the fast or slow axis of the connecting polarization maintaining fiber. The alignment at the PBC 140 is preferably such that both optical tributary signals are optimally coupled to the output port of the PBC 140. One tributary signal aligned with at or near 100% transmission of the Transverse Electric (TE) mode and the other with at or near 100% transmission of the Transverse Magnetic (TM) mode.

Furthermore, it is desirable to shift one optical tributary signal by a predefined amount of time by a delay device 135 prior to coupling to PBC 140. This is desired because it helps to avoid coherent mixing of the optical tributary signals when multiplexed later. A logical one in each of the optical tributary signals becomes adjacently multiplexed pulses instead of pulses in two different polarization states at the same time. In the exemplary embodiment, delay device 135 is a conventional delay line that operates to delay or shift the optical tributary signal from soliton tx 1 130a by one bit period relative to the other tributary signal. Those skilled in the art will be familiar with PBC's and delay line devices for use at particular data rates and particular wavelengths.

At PBC 140, the optical tributary signals are fed into two polarized inputs that have a characteristic polarization relationship between them. In the exemplary embodiment, one of the optical tributary signals is fed into TE input 141 while the other optical tributary signal is fed into TM input 142. Using such polarized inputs, the PBC 140 adjusts the polarization relationship between the optical tributary signals. In other words, the time shifted optical tributary signal and the other optical tributary signal are polarization multiplexed together to yield a higher-speed multiplexed optical signal on an output 143 of PBC. The two tributary signals are in a predetermined polarization relationship, preferably orthogonal. Accordingly, the higher-speed multiplexed optical signal is provided by PBC 140 to optical fiber 125.

By multiplexing the two optical tributary signals into a time-shifted and orthogonal polarization relationship, coherent mixing of the two signals is advantageously avoided, placing less stringent requires on source extinction ratio and adjacent pulse inter-symbol interference (ISI). FIG. 3 illustrates this relationship as well as the offset or time-shift relative to each tributary signal.

Additionally, this type of multiplexing reduces soliton-to-soliton interactions for orthogonally polarized adjacent pulses. There are no modifications required to optical fiber 125 or any optical amplifiers (not shown) between polarization multiplexer 105 and polarization demultiplexer 110 to accommodate such polarization multiplexed solitons.

As the higher-speed multiplexed optical signal propagates down optical fiber 125, it is contemplated that one or more regenerative devices (not shown) may be encountered which increase the strength of the signal and help to maintain the shape of the signal. Eventually, the multiplexed signal encounters polarization demultiplexer 110, which demultiplexes the higher-speed multiplexed optical signal.

In general, polarization demultiplexer 110 separates the lower-speed optical tributaries and provides them to the appropriate receivers (e.g., receiver 1 120a, receiver 2 120b) where the tributary data streams can be demodulated and used. In more detail, polarization demultiplexer 110 separates the polarization multiplexed optical tributary signals based on the predetermined polarization relationship between the tributaries, such as an orthogonal relationship. High-speed electro-optics are advantageously not required to demultiplex from a 20 Gb/sec to two 10 Gb/sec tributaries because polarization demultiplexer 110 uses low-speed devices for feedback. The polarization state of the higher-speed optical signal can be adjusted based on low-speed feedback to optimize an autocorrelation value used to determine the extinction ratio of one of the tributary signals.

The autocorrelation value indicates second order autocorrelation of an optical pulse and is a function of the time displacement away from the peak of the pulse. The extinction ratio is related to the autocorrelation value at the peak ($ACF_{peak}$, t=0) versus the autocorrelation value at the null ($ACF_{null}$, t=+/− half bit period). Thus, the extinciton ratio (ER) can be expressed as $ACF_{peak}/ACF_{null}$. In logarithmic terms, ER(dB) is often displayed as a value in dB of 10*log(ER). Further details regarding the operation and preferred implementation of polarization demultiplexer 110 consistent with the invention are explained below with regards to FIGS. 3 and 4.

In FIG. 2, an exemplary polarization multiplexed signal 200 is graphically illustrated. Multiplexed signal 200 contains two optical tributary signals 205 that have been shifted in time and multiplexed in an orthogonal polarization relationship consistent with an embodiment of the present invention. In the example illustrated in FIG. 1, one optical tributary signal is fed into TE input 141 while the other optical tributary signal is fed into TM input 142. In the exemplary embodiment, data from the optical tributary signal fed into TE input 141 and data from the optical tributary signal fed into TM input 142 are shifted in time relative to each other (due to delay device 135) and are orthogonally polarized with respect to each other (due to PBC 140).

It is also possible to multiplex the orthogonal solitons in the same time slot without changing the setup. However, having a 180 degree shift between the orthogonal pulses helps reduce nonlinear cross polarization coupling effects in the optical fiber.

Multiplexed signal 200 depicted in FIG. 2 shows various time slots 210a–f in which data from tributary sources 115a, 115b may appear. For example, if tributary source 115a provides a data stream of "111" to soliton transmitter 130a, soliton transmitter 130a would provide a series of three soliton pulses as an optical tributary signal. Similarly, if the other tributary source 115b provides a data stream of "001", then the other soliton transmitter 130b would provide two periods without a soliton pulse before a final period with a single soliton pulse. As these optical tributary signals are fed into TE input 141 and TM input 142 of PBC 140, polarization multiplexed signal 200 is formed. The "111" data stream is represented by the pulses in TE tributary signal time slots 210a, 210c, and 210e. As depicted in FIG. 2, these pulses are delayed relative to the corresponding time slots 210b, 210d, and 210f of the TM tributary signals. Additionally, the pulses in TE tributary signal time slots 210a, 210c, and 210e are in an orthogonal relationship to the pulses in TM tributary signal time slots 210b, 210d, and 210f. In this manner, tributary signals within higher-speed multiplexed optical signal 200 are in an orthogonal polarization relationship and can be adjacent, but not overlapping in time with each other.

In the context of a system as illustrated in FIG. 1 that produces a higher-speed multiplexed optical signal as depicted in FIG. 2, polarization demultiplexing can be described which receives and demultiplexes the higher-speed multiplexed optical signal back into lower-speed tributary optical signals. FIG. 3 is a block diagram illustrating an exemplary polarization demultiplexer consistent with an embodiment of the invention capable of performing such a function.

Referring now to FIG. 3, polarization demultiplexer 110 generally includes a polarized splitter 305 and a feedback unit 300. Polarized splitter 305 separates the higher-speed multiplexed optical signal into lower-speed tributary signals based upon the predetermined polarization relationship between them. In other words, when the polarization state of the higher-speed multiplexed optical signal is properly aligned (as it is incident upon polarized splitter 305), one of the lower-speed tributary signals is fully demultiplexed out of a TM output 335 and the other tributary signal is demultiplexed out of a TE output 340 based on the predetermined polarization relationship between the tributary signals. For example, when the multiplexed signal is properly aligned, one tributary signal is separated out and provided on TE output 340 while a second tributary signal is separated out and provides on TM output 335 due to its orthogonal relationship to the first tributary signal. An example of such a polarized splitter (also known as a polarization beam splitter) can be obtained from JDS Fitel Fibercore.

In an embodiment of the invention, one of the tributaries split out of polarized splitter 305 is provided to an optical coupler 310. Optical coupler 310 samples the tributary signal (typically only approximately 5% of the tributary signal) before providing the remaining part of the tributary signal to receiver 2 120b. Optical coupler 310 provides the sampled tributary signal to feedback unit 300, preferably to an autocorrelator 320 within polarization feedback unit 300.

An autocorrelator, such as autocorrelator 320, is a low-speed device capable of measuring the second order autocorrelation of short optical pulses. In general, the autocorrelator splits an optical pulse into two pulses of roughly the same intensity and then recombines them with a variable degree of time delay. The duration and amplitude of the optical pulse is inferred from the resulting interference signal (i.e., the autocorrelation value of the tributary signal). Typically, the output of the autocorrelator (the autocorrelation value of the tributary signal) can be detected on a standard low-speed oscilloscope and represents the temporal intensity profile of the tributary signal. Those skilled in the art will appreciate that while the autocorrelator measures very short pulses with only a low-speed sampling rate, such as less than 100 Hz.

Low-speed feedback, typically an autocorrelation value of the sampled tributary signal, is used to properly align the multiplexed signals' state of polarization and, as a result, effectively and optimally demulitplex the tributaries. The extinction ratio based upon autocorrelation value measurements is preferably maximized to aid in demultiplexing.

In another embodiment, an extinction ratio can be determined based on the measured autocorrelation value and the extinction ratio can also be maximized to ensure optimal demultiplexing of the tributary signals. In general, an extinction ratio is an ON/OFF power ratio. More particularly stated, an extinction ratio is a ratio of the average optical power in a logical one when compare to the average optical power in a logical zero. The greater the extinction ratio, the easier it is for a system to receive data in the presence of broadband noise. Accordingly, the extinction ratio is a parameter related to system power budget and bit error rate (BER) performance of the system.

In more detail, the exemplary embodiment of the invention includes feedback unit 300 having autocorrelator 320 and a polarization adjustment device 315 responsive to the output of autocorrelator 320. Autocorrelator 320 measures an autocorrelation value of one of the tributaries and provides the value to polarization adjustment device 315, which in turn adjusts a polarization state of the higher-speed multiplexed signal based on the autocorrelation value. Those skilled in the art will be familiar with autocorrelators, such as those available from Positive Light and other optical component testing companies.

Polarization adjustment device 315 is preferably made up of a processing unit 330 and a programmable polarization controller 325. As autocorrelator 320 measures the autocorrelation value of the tributary signal, autocorrelator 320 provides a control signal 347 representing the autocorrelation value on an output 345, which is connected to a control input 350 of processing unit 330.

In general, processing unit 330 may be implemented as any type of responsive feedback circuit, whether analog or digital and whether programmable or hard-wired. In the exemplary embodiment, processing unit 330 is a digital microprocessor-based circuit capable of providing a feedback signal 355 to a polarization controller 325 based on the autocorrelation value. In response to receiving feedback signal 355, polarization controller 325 alters or adjusts the state of polarization of the higher-speed multiplexed optical signal based upon the value of feedback signal 355. Thus, the range of values for the feedback signal 355 depends upon the type of stimulus required to manipulate and adjust polarization controller 325. In this manner, processing unit 330 can be used to maximize the autocorrelation value measured by autocorrelator 320 and can determine and maximize an extinction ratio based on the measured autocorrelation value. In an embodiment of the invention, the polarization controller is a Model HP 11896A Polarization Controller from Hewlett-Packard.

In the exemplary embodiment, maximizing the autocorrelation value of the tributary signal or the value of the extinction ratio can be accomplished by altering feedback signal 355 to sweep through different polarization states of the higher-speed multiplexed signal. More particularly stated, the autocorrelation value or extinction value may be maximized by sweeping the polarization state of the multiplexed signal over some or all of a Poincare sphere. A Poincare sphere is a three-dimensional format that represents the possible states of polarization for an optical signal.

As depicted in FIG. 4, an exemplary Poincare sphere 400 is shown in a three-dimensional coordinate system (S1, S2, S3) as a representation of the polarization state of an optical signal. Each state of polarization is assigned a specific point on the Poincare sphere, such as points 405–435. In general, three coordinates of such a point 405 on the Poincare sphere are conventionally called normalized Stokes parameters (s1, s2, s3). Stokes parameters (S0, S1, S2, and S3) are conventionally used within a real matrix called a Stokes vector that completely describes the state of polarization of a optical signal. Each element of the matrix is based upon measured power levels. S0 is the average power level of the entire optical signal. S1 is the difference in power between the horizontal and vertical linear polarization components of the signal. S2 indicates the power difference between +45 degree and −45 degree linear polarization. Finally, S3 is the power difference between the right-hand circular polarization and the left-hand circular polarization. The points on Poincare sphere 400 represent Stokes parameters normalized to the average power, S0 and, as a result, different states of polarization. For example, s1=S1/S0, s2=S2/S0, etc.

Accordingly, those skilled in the art will appreciate that points along the equator, such as points 410, 415, 425, and 430, represent states of linear polarization. Points at the poles, such as points 420 and 435, represent left-hand circular polarization and right-hand circular polarization respectively. "Sweeping" the polarization state of a signal over a portion of Poincare sphere is accomplished by moving the signal's point (i.e., the polarization state of the signal) to another point within that portion of the Poincare sphere. In this manner, sweeping the polarization state of a signal involves close to linearly adjusting the signals' polarization state from an initial point to a new point within the section of the Poincare sphere. At the new point, the multiplexed signal has a new state of polarization as it exits polarization controller 325 and is incident upon polarized splitter 305. Thus, the low-speed feedback loop is complete to demultiplex a higher-speed multiplexed optical signal (e.g., 20 Gbit/sec) into two lower-speed tributary optical signals (e.g., 10 Gbit/sec) without using complex and high-speed electro-optics.

FIG. 5 is a flow diagram illustrating exemplary steps for polarization demultiplexing at least two optical tributary signals into a higher-speed optical signal consistent with an embodiment of the present invention. As shown in FIG. 5, the method 500 begins at step 505 where two lower-speed tributary signals are polarization multiplexed into a higher-speed optical multiplexed signal. In the exemplary embodiment, the polarization relationship between the tributary signals when multiplexed together is orthogonal. Additionally, the two tributary signals are offset in time or delayed. This advantageously helps to prevent coherent mixing of the tributaries as they are multiplexed into the higher-speed signal.

At step 510, the higher-speed signal is propagated along an optical path, such as optical fiber 125. At step 515, the higher-speed optical signal is received by polarization demultiplexer 110. In the exemplary embodiment, the higher-speed optical signal is initially received by polarization controller 325, which alters or adjusts the signal's state of polarization to a starting or default value. Thereafter, the higher-speed optical signal is provided to polarized splitter 305.

At step 520, the higher-speed optical signal is separated into its tributary signals based upon the orthogonal relationship between the tributaries. In the exemplary embodiment, polarized splitter 305 separates the higher-speed multiplexed optical signal (e.g., 20 Gbit/sec signal) into two tributary optical signals propagating as a lower-speed (e.g., 10 Gbits/sec) based on the orthogonal polarization relationship between the multiplexed tributaries. This is preferably a completely passive process within polarized splitter 305. Thus, one tributary is provided on TE output 340 to receiver 1 120a while the other tributary is provided on TM output 3 to receiver 2 120b.

However, in order to make sure that the higher-speed multiplexed signal is optimally polarization demultiplexed; steps 525–535 are often repeatedly performed returning back to step 520 until an optimal demultiplexing condition is satisfied. An optimal demultiplexing condition is generally defined as a condition where each of the tributaries are substantially recovered from the multiplexed signal. Once locked onto a maximized extinction ratio, slow changes in the input state of polarization will be tracked in what is functionally a continuous feedback control loop.

At step 525, an autocorrelation value of one of the tributary signals is determined. In the exemplary embodiment, optical coupler 310 samples a small amount of the energy in one of the tributary signals and provides the sample to autocorrelator 320. Autocorrelator 320 is only required to detect pulses at the lower-speed, rather than operate at the higher multiplexed speed. For example, autocorrelator 320 is only required to detect pulses at 10 GHz rather that at the higher multiplexed speed of 20 GHz. Once an autocorrelation value has been determined, control signal 347 is sent from autocorrelator 320 to processing unit 330.

At step 530, the polarization state of the higher-speed multiplexed optical signal is adjusted based on the autocorrelation value of the lower-speed tributary signal. In the exemplary embodiment, processing unit 330 responds to the received control signal 347 by providing feedback signal 355 to polarization controller 325. In this manner, processing unit 330 programs or directs the functional operation of polarization controller 325 to responsively alter or adjust the state of polarization for the higher-speed multiplexed signal. In this manner, polarization controller 325 is also referred to as a programmable polarization controller because it is functionally responsive to a processing unit, such as processing unit 330. Once the polarization state has changed, a determination of whether the autocorrelation value has been maximized is done at step 535. If so, then method 500 ends. Otherwise, step 535 returns to step 520 because the higher-speed optical signal's state of polarization needs further adjustment to maximize the autocorrelation value, which indicates a condition of optical demultiplexing.

As previously mentioned, despite the fact that FIG. 5 shows an ending step, steps 520–535 are normally performed in a continuous fashion as part of a feedback loop. This loop operates to continually optimize how the polarization multiplexed signal is demultiplexed upon small changes in the state of polarization of the high speed signal.

In another embodiment of the present invention, an extinction ratio is determined over a predefined period of time based upon the autocorrelation value from step 525. The inventor has discovered that an extinction ratio of the tributary signal using the autocorrelation value can indicate alignment of the higher-speed optical signal's polarization state. Thus, in this alternative embodiment, the polarization state of the higher-speed optical signal may be adjusted after the predefined period based upon the extinction ratio determined at step 530. Finally, at step 535, a determination may be made whether the extinction ratio is maximized. If so, then the method ends after step 535. Otherwise, step 535 proceeds back to step 520 to repeat the measuring, determining, and adjusting feedback process described above.

In summary, an exemplary embodiment of the present invention is part of optical transmission system 100, including polarization multiplexer 105 and polarization demultiplexer 110. Polarization multiplexer 105 orthogonally multiplexes two tributary signals into a higher-speed polarization multiplexed optical signal. The signal is propagated through the system 100 on a high-speed optical path (such as fiber 125) until polarization demultiplexer 110 receives it. Polarization demultiplexer 110 separates the two lower-speed tributary signals from the higher-speed optical signal using polarized splitter 305. A feedback unit 300, typically using autocorrelator 320 and polarization adjustment device 315, adjusts the higher-speed signal's state of polarization based upon an amplitude characteristic (more particularly an extinction ratio based on measured autocorrelation values) of one of the lower-speed tributary signals. Polarization adjustment device 315 usually comprises processing unit 330 and polarization controller 325. The autocorrelation value of one of the lower-speed tributary signals is provided to processing unit 330, which in turn manipulates or adjusts the higher-speed signal's polarization state based upon the autocorrelation value. Ideally, this type of feedback is performed until the autocorrelation extinction ratio value is maximized.

It will be apparent to those skilled in the art that various modifications and variations can be made to the system and method of the present invention without departing from the spirit or scope of the invention. For example, the polarization demultiplexer depicted in the figures is intended to be exemplary of preferred embodiments. The precise feedback structure may readily be altered by one of ordinary skill in the art to obtain the equivalent demultiplexing apparatus as disclosed herein without departing from the spirit or scope of this invention. The present invention covers the modifications and variations of this invention provided they come within the scope of the appended claims and their equivalents.

What is claimed is:

1. An apparatus for polarization demultiplexing a multiplexed optical signal into a plurality of optical tributary signals within an optical transmission system, comprising:

a polarization beam splitter for separating one of the optical tributary signals from others of the optical tributary signals based upon an orthogonal polarization relationship between the one of the optical tributary signals from the others of the optical tributary signals; and a feedback unit receiving the one of the optical tributary signals and optically coupled to an input of the polarization beam splitter, the feedback unit adjusting a polarization state of the multiplexed optical signal based upon an autocorrelation value of the one of the optical tributary signals measured by the feedback unit.

2. The apparatus of claim 1, wherein the feedback unit further comprises:

an autocorrelator having an input optically coupled to the one of the optical tributary signals and providing the autocorrelation value of the one of the optical tributary signals on a low-speed output of the autocorrelator; and a polarization adjustment device having an optical input for receiving the multiplexed optical signal, an optical output coupled to the input of the polarization beam splitter, and a control input coupled to the low-speed output of the autocorrelator, the polarization adjustment device capable of adjusting the polarization state of the multiplexed optical signal based upon the autocorrelation value.

3. The apparatus of claim 2, wherein the polarization adjustment device is further operative to determine an extinction ratio of the one of the optical tributary signals based upon the autocorrelation value and maximize the extinction ratio by adjusting the polarization state of the multiplexed optical signal.

4. The apparatus of claim 2, wherein the polarization adjustment device further comprises:

a processing unit coupled to the low-speed output of the autocorrelator and providing a feedback signal on a feedback output of the processing unit based upon the autocorrelation value; and a polarization controller having an optical input for receiving the multiplexed optical signal, an optical output coupled to the input of the polarization beam splitter, and a feedback input coupled to the feedback output of the processing unit, the polarization controller capable of adjusting the polarization state of the multiplexed optical signal based upon the value of the feedback signal.

5. The apparatus of claim 4, wherein the processing unit is further operative to maximize the autocorrelation value by altering the feedback signal to sweep polarization state of the multiplexed optical signal over a portion of a Poincare sphere.

6. The apparatus of claim 4, wherein the processing unit is further operative to determine an extinction ratio of the one of the optical tributary signals based upon the autocorrelation value and to maximize the extinction ratio by altering the feedback signal to sweep the polarization state of the multiplexed optical signal over the portion of the Poincare sphere.

7. The apparatus of claim 1, wherein the polarized splitter has a first output providing the one of the optical tributary signals and a second output providing the others of the optical tributary signals, the one of the optical tributary signals and the others of the optical tributary signals being in a predetermined polarization relationship within the multiplexed optical signal.

8. The apparatus of claim 1 further comprising a first receiver coupled to the first output of the polarization beam splitter and a second receiver coupled to the second output of the polarization beam splitter.

9. A polarization multiplexed optical transmission system, comprising:

a polarized multiplexer having a first input for receiving a first low-speed tributary signal and a second input for receiving a second low-speed tributary signal, the polarized multiplexer being operative to time division multiplex the first low-speed tributary signal and the second low-speed tributary signal into a higher-speed optical signal in an orthogonal polarization relationship with the first low-speed tributary signal being offset from the second low-speed tributary signal in time by a predefined time period;

a high-speed optical path coupled to an output of the polarized multiplexer for receiving the higher-speed optical signal; and a polarized demultiplexer coupled to the high-speed optical path for receiving and demultiplexing the higher-speed optical signal, the polarized demultiplexer comprising a polarized splitter for receiving the higher-speed optical signal and separating the first low-speed tributary signal from the second low-speed tributary signal within the higher-speed optical signal, and a feedback unit optically coupled to an input of the polarized splitter, the feedback unit capable of adjusting a polarization state of the higher-speed optical signal based upon an amplitude characteristic of the first low-speed tributary signal measured by the feedback unit.

10. The system of claim 9, wherein the polarization multiplexer avoids coherent mixing of the first low-speed tributary signal and the second low-speed tributary signal by maintaining the orthogonal polarization relationship as the polarization multiplexer time division multiplexes the first low-speed tributary signal and the second low-speed tributary signal.

11. The system of claim 10, wherein the polarization multiplexer is further capable of time division multiplexing the first low-speed tributary signal and the second low-speed tributary signal such that a first pulse in the first low-speed tributary signal and an adjacent pulse in the second low-speed tributary signal are offset in time and offset in polarization.

12. The system of claim 9, wherein the feedback unit further comprises:

an autocorrelator having an input optically coupled to the first low-speed tributary signal from the polarized splitter and providing the amplitude characteristic on a low-speed output based upon an autocorrelation value of the first low-speed tributary signal; and a polarization adjustment device having an optical input for receiving the higher-speed optical signal, an optical output coupled to an input of the polarized splitter, and a control input coupled to the low-speed output of the autocorrelator, the polarization adjustment device capable of adjusting the polarization state of the higher-speed optical signal based upon the autocorrelation value.

13. The system of claim 12, wherein the polarization adjustment device is further operative to determine an extinction ratio of the first low-speed tributary signal based upon the autocorrelation value and maximize the extinction ratio by adjusting the polarization state of the higher-speed optical signal.

14. A method for polarization demultiplexing at least two optical tributary signals into a higher-speed optical signal, comprising the steps of:

receiving the higher-speed optical signal;

separating a first of the optical tributary signals from a second of the optical tributary signals based upon a predetermined polarization relationship between the first of the optical tributary signals from a second of the optical tributary signals;

determining an autocorrelation value of the first of the optical tributary signals; and adjusting a polarization state of the higher-speed optical signal based upon the autocorrelation value of the first of the optical tributary signals.

15. The method of claim 14, wherein the adjusting step further comprises adjusting the polarization state of the higher-speed optical signal and repeating the determining step in order to maximize the autocorrelation value.

16. The method of claim 15, wherein the adjusting step further comprises sweeping the polarization state of the higher-speed optical signal over a portion of a Poincare sphere and repeating the determining step in order to maximize the autocorrelation value.

17. The method of claim 16, wherein the determining step further comprises determining an extinction ratio of the first of the optical tributary signals over a predefined period of time; and wherein the adjusting step further comprises adjusting the polarization state of the higher-speed optical signal based upon the extinction ratio.

18. The method of claim 17, wherein the adjusting step further comprises sweeping the polarization state of the higher-speed optical signal over a portion of a Poincare sphere and repeating the determining step in order to maximize the extinction ratio.

* * * * *